United States Patent
Baldemair et al.

(10) Patent No.: US 8,954,064 B2
(45) Date of Patent: Feb. 10, 2015

(54) ARRANGEMENT AND METHOD FOR IDENTIFYING PUCCH FORMAT 3 RESOURCES

(75) Inventors: Robert Baldemair, Solna (SE); Jung-Fu Cheng, Fremont, CA (US); Dirk Gerstenberger, Stockholm (SE); Daniel Larsson, Solna (SE); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 597 days.

(21) Appl. No.: 13/122,529

(22) PCT Filed: Mar. 18, 2011

(86) PCT No.: PCT/SE2011/050303
§ 371 (c)(1),
(2), (4) Date: Aug. 9, 2011

(87) PCT Pub. No.: WO2012/023892
PCT Pub. Date: Feb. 23, 2012

(65) Prior Publication Data
US 2012/0046032 A1   Feb. 23, 2012

Related U.S. Application Data

(60) Provisional application No. 61/375,658, filed on Aug. 20, 2010.

(51) Int. Cl.
H04W 4/00 (2009.01)
H04L 5/00 (2006.01)

(52) U.S. Cl.
CPC .................................. H04L 5/0053 (2013.01)
USPC ............................................ 455/434; 455/68

(58) Field of Classification Search
USPC .................................................. 455/434, 68
See application file for complete search history.

(56) References Cited

U.S. PATENT DOCUMENTS

2010/0142467 A1   6/2010   Tiirola et al.
2011/0243066 A1*  10/2011  Nayeb Nazar et al. ....... 370/328

FOREIGN PATENT DOCUMENTS

WO   2008/156293 A2   12/2008

OTHER PUBLICATIONS

EPO, Int'l Search Report in PCT/SE2011/050303, Jul. 5, 2011.
Huawei et al., Signaling Design for PUCCH Format 3, R1-105832, Nov. 15, 2010, 3GPP RAN WG1 Meeting 63, Jacksonville, FL, US.
Ericsson et al., PUCCH Design for CA, R1-103506, Jun. 28, 2010, 3GPP RAN WG1 Meeting 61bis, Dresden, DE.
(Continued)

Primary Examiner — Wesley Kim
Assistant Examiner — Edd Rianne Plata
(74) Attorney, Agent, or Firm — Patent Portfolio Builders PLLC

(57) ABSTRACT

The disclosure relates to a user equipment for a wireless communications system, and to a related method for identifying a resource to use for a transmission of control information on a physical uplink control channel, PUCCH, format 3. The method comprises receiving (610) a resource index from a serving radio base station, and identifying (620) the resource to use for the transmission of the control information in a subframe based on the received resource index, wherein the identified resource is within a same confined set of physical resource blocks regardless of if a normal or a shortened PUCCH format 3 is used in the subframe.

14 Claims, 9 Drawing Sheets

(56) References Cited

OTHER PUBLICATIONS

EPO, Written Opinion in PCT/SE2011/050303, Jul. 5, 2011.
EPO, Int'l Preliminary Report on Patentability in PCT/SE2011/050303, Jul. 23, 2012.
Nokia Siemens Networks, Nokia, "Details for Block Spread DFT-S-OFDMA", 3GPP TSG RAN WG1 Meeting #62, Aug. 23-27, 2010, Madrid, Spain, R1-104429.
NTT DoCoMo, "Investigation on PUCCH Format for Full A/N Transmission", 3GPP TSG RAN WG1 Meeting #61bis, Jun. 28-Jul. 2, 2010, Dresden, Germany, R1-104015.
Catt, "Remaining Details on PUCCH Format 3 in Rel-10", 3GPP TSG RAN WG1 Meeting #62bis, Oct. 11-15, 2010, Xi'an, China, R1-105152.
JP Office Action mailed on Oct. 6, 2014 in related Application No. JP 2013-524817.

* cited by examiner

ARRANGEMENT AND METHOD FOR IDENTIFYING PUCCH FORMAT 3 RESOURCES

TECHNICAL FIELD

The disclosure relates to physical uplink control channel, PUCCH, format 3. More particularly, the disclosure relates to a user equipment and a method in the user equipment for identifying a resource to use for a transmission of control information on PUCCH format 3.

BACKGROUND

3rd Generation Partnership (3GPP) Long Term Evolution (LTE) is a project to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a user equipment (UE) 150 is wirelessly connected to a radio base station (RBS) 110a commonly referred to as an eNodeB or eNB (evolved NodeB), as illustrated in FIG. 1. In E-UTRAN, the eNodeBs 110a-c are directly connected to the core network (CN) 190. An LTE system is sometimes also called an Evolved Universal Terrestrial Radio Access (E-UTRA) communication system. In an LTE system, Orthogonal Frequency Division Multiplexing (OFDM) is used in the downlink, i.e. in the transmission from eNodeB to UE, and Discrete Fourier Transform Spread (DFTS) OFDM is used in the uplink, i.e. in the transmission from UE to eNodeB.

The basic LTE downlink physical resource may be seen as a time-frequency grid as illustrated in FIG. 2a, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms, as illustrated in FIG. 2b. Furthermore, the resource allocation in LTE is typically described in terms of resource blocks, also called Physical Resource Blocks (PRB), where a resource block corresponds to one slot of 0.5 ms in the time domain and twelve contiguous subcarriers in the frequency domain, as illustrated in FIG. 3a. Resource blocks are numbered in the frequency domain, starting with 0 from one end of the system bandwidth.

Downlink transmissions are dynamically scheduled, i.e., in each subframe the base station or eNodeB transmits control information including information about to which UEs or terminals data is transmitted, and upon which resource blocks the data is transmitted in the current downlink subframe. This control signaling is typically transmitted in the first 1, 2, 3 or 4 OFDM symbols in each subframe. A downlink system with three OFDM symbols for control signaling is illustrated in FIG. 2c.

LTE uses Hybrid Automatic Repeat Request (HARQ). After receiving downlink data in a subframe, the UE attempts to decode it and reports to the eNodeB whether the decoding was successful or not. The acknowledgment is sent in form of an ACK when decoding is successful, and in form of a NACK when the decoding is unsuccessful. In case of an unsuccessful decoding attempt, the eNodeB may retransmit the erroneous data.

Uplink control signaling from the UE to the eNodeB comprises, in addition to HARQ acknowledgements for received downlink data:
- Scheduling requests, indicating that a UE needs uplink resources for uplink data transmissions; and
- UE reports related to the downlink channel conditions, typically referred to as channel status reports, used as assistance for the eNodeB downlink scheduling.

Such uplink control information is referred to as Layer 1 and Layer 2 (L1/L2) control information. If the UE hasn't already been assigned an uplink resource for data transmission, L1/L2 control information is transmitted in uplink resources specifically assigned for uplink L1/L2 control on a Physical Uplink Control CHannel (PUCCH). As illustrated in FIG. 3a, these resources may be located at the edges of the total available cell bandwidth. Each such resource consists of 12 subcarriers within each of the two slots of an uplink subframe, i.e. a pair of resource blocks or PRBs. In order to provide frequency diversity, these frequency resources are frequency hopping on the slot boundary, i.e. one resource consists of 12 subcarriers at the lower part of the spectrum within the first slot of a subframe and an equally sized resource at the upper part of the spectrum during the second slot of the subframe or vice versa. If more resources are needed for the uplink L1/L2 control signaling, e.g. in case of a very large overall transmission bandwidth supporting a large number of users, additional resource blocks may be assigned next to the previously assigned resource blocks in the frequency domain.

The reasons for locating the PUCCH resources at the edges of the overall available spectrum are two-fold:
1. Together with the frequency hopping described above, PUCCH resources at the edges of the spectrum maximizes the frequency diversity experienced by the control signaling;
2. Assigning uplink resources for the PUCCH at other positions within the spectrum, i.e. not at the edges, would fragment the uplink spectrum making it impossible to assign very wide transmission bandwidths to a single UE and still retain the single-carrier property of the uplink transmission However, the bandwidth of one resource block during one subframe is too large for the control signaling needs of a single UE. Therefore, to efficiently exploit the resources set aside for control signaling, multiple terminals may share the same resource block pairs. This is done by assigning the different UEs different orthogonal phase rotations of a cell-specific length-12 frequency domain sequence and/or different orthogonal time-domain cover codes covering the symbols within a slot or subframe.

There are different PUCCH formats defined in the 3GPP LTE standard to handle the different types of uplink control signaling. In LTE Rel-8, a PUCCH format 1 resource is defined and used for either a HARQ acknowledgement or a scheduling request. PUCCH format 1 is capable of at most two bits of information per subframe. As a channel status report consists of multiple bits per subframe, PUCCH format 1 may obviously not be used for signaling channel status reports. Transmission of channel status reports on the PUCCH is instead handled by PUCCH format 2, which is capable of multiple information bits per subframe. There are actually three variants of this PUCCH format: PUCCH format 2, PUCCH format 2a, and PUCCH format 2b. The will hereinafter all be referred to as PUCCH format 2 for the sake of simplicity.

However, with the introduction of carrier aggregation (CA) in LTE Rel-10, a new PUCCH format is needed. In LTE Rel-10 the total available spectrum may be wider than the maximum 20 MHz LTE carrier corresponding to the total available spectrum in Rel-8, and may appear as a number of LTE carriers to an LTE Rel-8 UE. Each such carrier may be referred to as a Component Carrier (CC) or a cell. To assure an efficient use of a wide carrier also for legacy UEs, CA is used implying that an LTE Rel-10 UE may receive multiple CCs, where the CCs have or at least are enabled to have the same structure as a Rel-8 carrier. CA is schematically illustrated in FIG. 4, where five CCs of 20 MHz provides a total aggregated bandwidth of 100 MHz. However, another use case for CA is when an operator makes use of smaller parts of bandwidths in different frequency bands, or within a same frequency band, to get one larger aggregated bandwidth. With CA, a PUCCH format that enables feedback of multiple HARQ bits corresponding to multiple CCs is needed. Such a PUCCH format is in the following referred to as PUCCH format 3. However, PUCCH format 3 may also be referred to as CA PUCCH format or DFTS-OFDM PUCCH format.

Sounding Reference Signals (SRS) transmitted by the UE may be used by the base station to estimate the quality of the uplink channel for large bandwidths outside the span assigned to a specific UE. SRS are configured periodically in a subframe, and are transmitted in the last DFTS-OFDM symbol of the subframe. This implies the need of both a normal PUCCH format 3 to use when no SRS are transmitted in the subframe, and a shortened PUCCH format 3 which is muted in the last DFTS-OFDM symbol of the subframe to avoid collisions with SRS transmissions when they are transmitted in the subframe. The amount of UEs that may share the PUCCH format 3 resource may therefore vary depending on if the shortened or the normal PUCCH format 3 is used.

SUMMARY

From a network configuration perspective it is of interest to have the same amount of resources utilized for PUCCH format 3 in all subframes. The PUCCH format 3 resources are most likely to be allocated at the band edge together with PUCCH format 2 and PUCCH format 1. However, the fact that less UEs may share the PUCCH format 3 resource in a subframe where SRS are transmitted and a shortened PUCCH format 3 is used, will have the effect that more resource blocks will be allocated for PUCCH format 3 when SRS is transmitted in the same subframe as PUCCH, compared to when no SRS are transmitted. The conventional solution to the problem of the varying resource need would be to overprovision PUCCH format 3 resources so that the PUCCH format 3 may extend into more resource blocks in case of subframes where the shortened PUCCH format 3 is used, without risking a collision with other transmissions. However, the drawback is a suboptimal resource utilization which affects system capacity and throughput.

Another approach would be to assign the resources for PUCCH format 2 and PUCCH format 1 so that they do not collide with the extended size of the shortened PUCCH format 3, instead of overprovisioning PUCCH format 3 resources. This is however only possible as long as periodicities used for PUCCH format 2 and PUCCH format 1 resources are even multiples of periodicities of subframes reserved for SRS transmission.

An object is therefore to address some of the problems and disadvantages outlined above, and to provide an allocation of resources for a subframe using a shortened PUCCH format 3 within the same set of resource blocks that would have been used for a subframe using a normal PUCCH format 3. This object and others are achieved by the method and user equipment according to the independent claims, and by the embodiments according to the dependent claims.

In accordance with an embodiment, a method in a user equipment of a wireless communication system, for identifying a resource to use for a transmission of control information on a physical uplink control channel, PUCCH, format 3 is provided. The method comprises receiving a resource index from a serving radio base station, and identifying the resource to use for the transmission of the control information in a subframe based on the received resource index. The identified resource is within a same confined set of PRBs regardless of if a normal or a shortened PUCCH format 3 is used in the subframe.

In accordance with another embodiment, a user equipment for a wireless communication system, configured to identify a resource to use for a transmission of control information on a physical uplink control channel, PUCCH, format 3 is provided. The user equipment comprises a receiving unit adapted to receive a resource index from a serving radio base station, and an identifying unit adapted to identify the resource to use for the transmission of the control information in a subframe based on the received resource index. The identified resource is within a same confined set of PRBs regardless of if a normal or a shortened PUCCH format 3 is used in the subframe.

An advantage of embodiments is that the resource utilization is improved as there is no need to overprovision PUCCH format 3 resources. This will result in higher system capacity and throughput. Another advantage is that it enables a simplified configuration of resources for other PUCCH formats and other channels.

Other objects, advantages and features of embodiments will be explained in the following detailed description when considered in conjunction with the accompanying drawings and claims.

DETAILED DESCRIPTION

Figure 1:
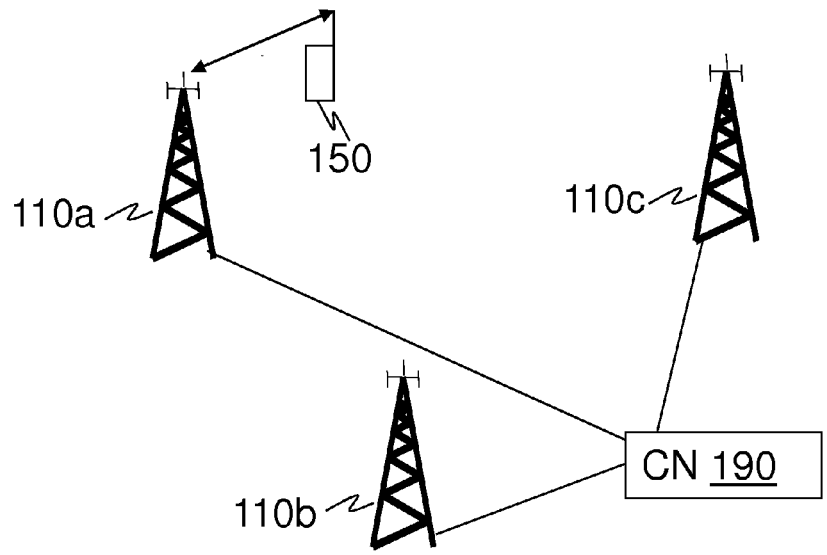
FIG. 1 is a block diagram illustrating an LTE network wherein embodiments may be implemented.
Figure 2A:
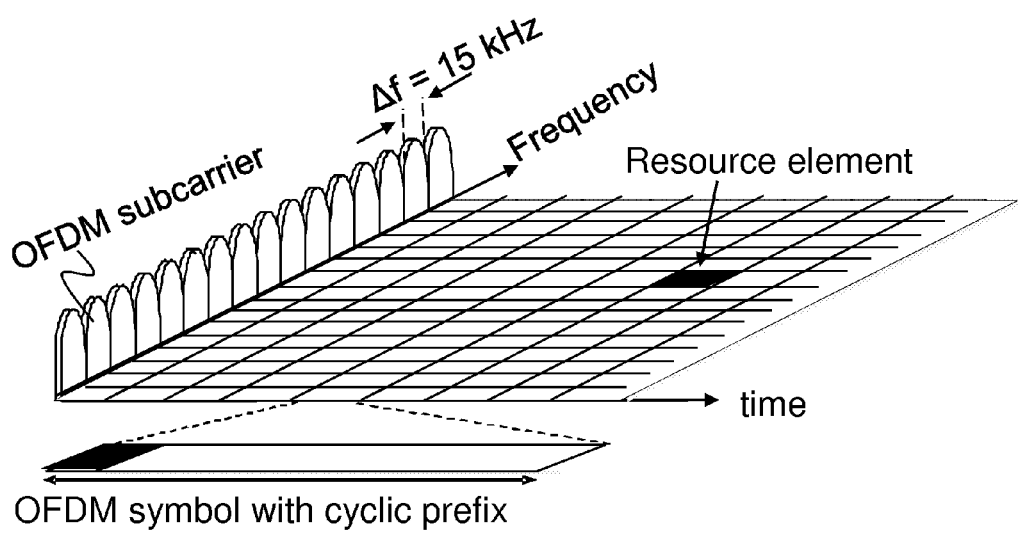
FIG. 2a illustrates the LTE downlink physical resources.
Figure 2B:
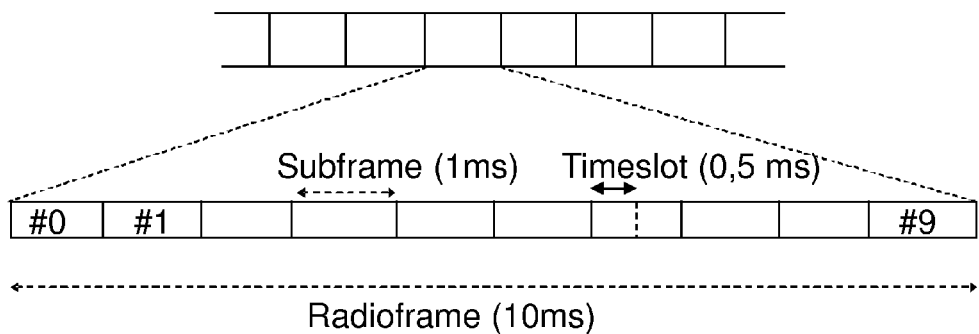
FIG. 2b illustrates the LTE time domain structure.
Figure 2C:
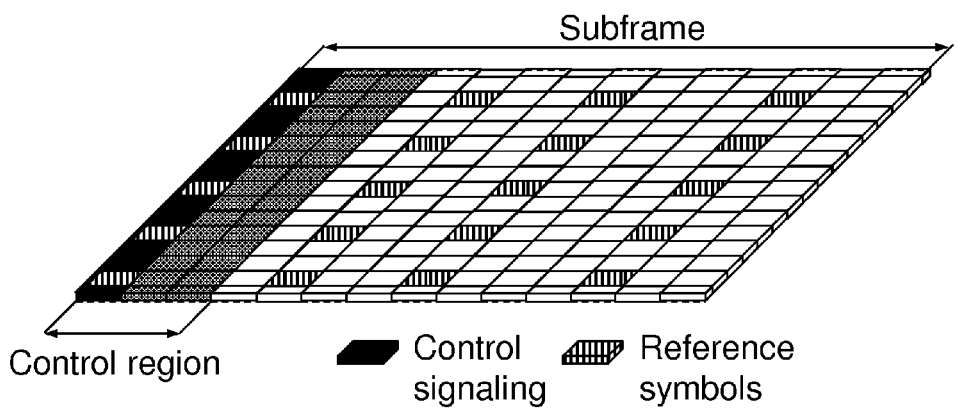
FIG. 2c illustrates an LTE downlink subframe.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of a method and a UE, they may also be embodied in a computer program product as well as in a system comprising a computer processor and a memory coupled to the processor, wherein the memory is encoded with one or more programs that may perform the method steps disclosed herein.

Embodiments are described herein by way of reference to particular example scenarios. Particular aspects are described in a non-limiting general context in relation to an LTE Rel-10 system. It should though be noted that the embodiments may also be applied to other types of wireless communications systems using PUCCH format 3. UEs in embodiments include, for example, mobile telephones, pagers, headsets, laptop computers and other mobile terminals.

This disclosure relates to a method in a UE of a wireless communication system, for identifying a resource to use for a transmission of control information on a PUCCH format 3. The following paragraphs details the background.

PUCCH Format 1

HARQ acknowledgements are used to acknowledge the reception of one transport block in the downlink. In case of spatial multiplexing, the reception of two transport blocks may be acknowledged. As already explained above, HARQ acknowledgements are transmitted on PUCCH.

Scheduling requests are used to request resources for uplink data transmission. Obviously, a scheduling request should only be transmitted when the UE is requesting resources, otherwise the UE should be silent in order to save battery resources and not create unnecessary interference. Hence, unlike HARQ acknowledgements, no explicit information bit is transmitted in the scheduling request; the information is instead conveyed by the presence or absence of energy on the corresponding PUCCH. However, the scheduling request, although used for a completely different purpose, share the same PUCCH format as the HARQ acknowledgement. This format is referred to as PUCCH format 1 in the 3GPP LTE specifications.

A PUCCH format 1 resource, used for either a HARQ acknowledgement or a scheduling request, is represented by a single scalar resource index. The UE does not know what physical resources that are configured for PUCCH, it only knows the resource index. From the index, the phase rotation and the orthogonal cover sequences are derived. For HARQ transmission, the resource index to use for transmission of the HARQ acknowledgement is given implicitly by the downlink control signaling on the Physical Downlink Control Channel (PDCCH) used to schedule the downlink transmission to the UE. Thus, the resources to use for an uplink HARQ acknowledgement vary dynamically and depend on the downlink control channel used to schedule the UE in each subframe.

In addition to dynamic scheduling by using the PDCCH, there is also the possibility to semi-persistently schedule a UE according to a specific pattern. In this case the configuration of the semi-persistent scheduling pattern includes information on the PUCCH resource index to use for the HARQ acknowledgement. This is also true for scheduling requests, where configuration information informs the UE which PUCCH resources to use for transmission of scheduling requests.

Thus, to summarize, PUCCH format 1 resources are split into two parts:
 1. A semi-static part used for scheduling requests and HARQ acknowledgements from semi-persistently scheduled UEs. The amount of resources used for the semi-static part of PUCCH format 1 resources does not vary dynamically.
 2. A dynamic part used for dynamically scheduled UEs. As the number of dynamically scheduled terminals varies, the amount of resources used for the dynamic PUCCHs varies.

PUCCH Format 2

Channel status reports are used to provide the eNodeB with an estimate of the channel properties at the UE in order to support channel-dependent scheduling. A channel status report consists of multiple bits per subframe. PUCCH format 1, which is capable of at most two bits of information per subframe, can obviously not be used for this purpose. Transmission of channel status reports on the PUCCH is instead handled by PUCCH format 2, which is capable of multiple information bits per subframe.

PUCCH format 2, is based on a phase rotation of the same cell-specific sequence as PUCCH format 1. Similarly to PUCCH format 1, a PUCCH format 2 resource may be represented by a resource index from which the phase rotation and other necessary quantities are derived. The PUCCH format 2 resources are semi-statically configured.

Resource Block Mapping for PUCCH

The L1/L2 control signals described above for both of the PUCCH formats 1 and 2, are as already explained transmitted on a resource block pair with one resource block in each slot. The resource block pair to use is determined from the PUCCH resource index. The resource block number to use in the first and second slots of a subframe may be expressed as:

$$RBnumber(i) = f(PUCCH\ index, i)$$

where i is the slot number (0 or 1) within the subframe and f is a function found in the 3GPP specification.

Figure 3A:
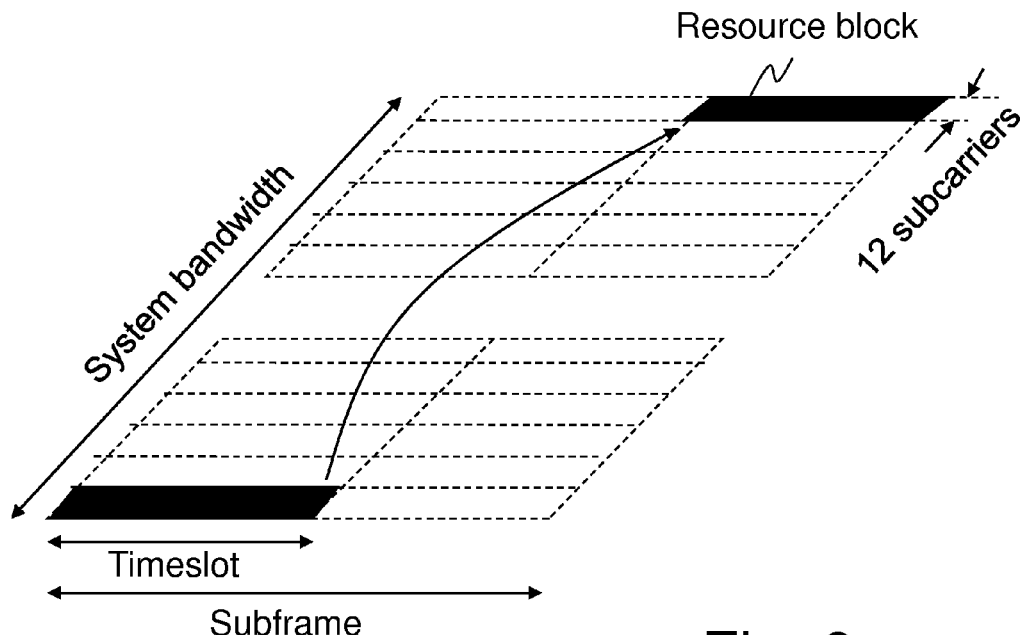
FIG. 3a illustrates frequency hopping on slot boundaries for PUCCH resources.
Figure 3B:
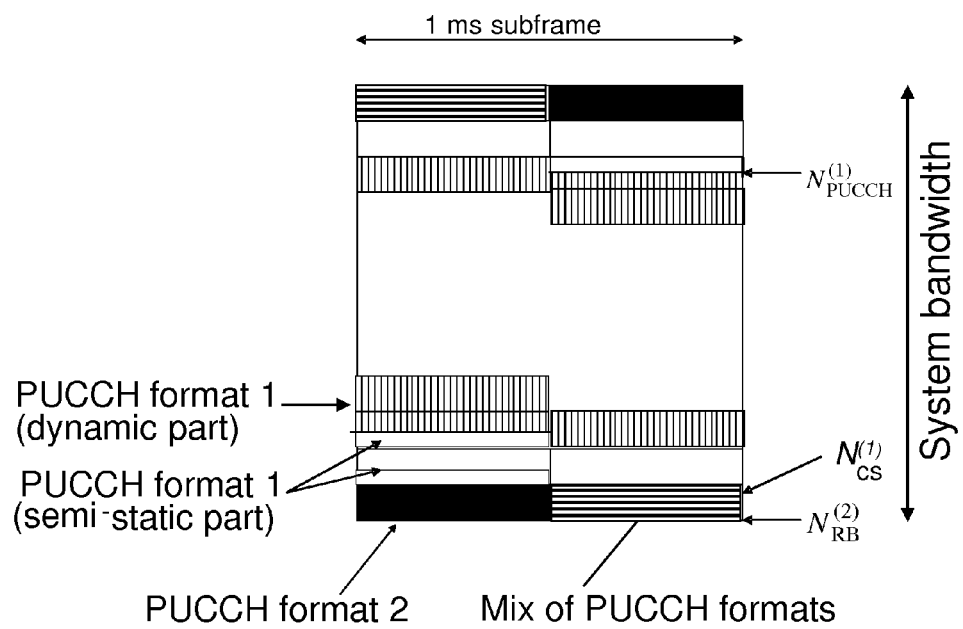
FIG. 3b illustrates an example of allocation of resource blocks for different PUCCH formats.

Multiple resource block pairs may be used to increase the control-signaling capacity; when one resource block pair is full the next PUCCH resource index is mapped to the next resource block pair in sequence. The mapping is in principle done such that PUCCH format 2 used for channel status reports is transmitted closest to the edges of the uplink cell bandwidth with the semi-static part of PUCCH format 1 next and finally the dynamic part of PUCCH format 1 in the innermost part of the bandwidth, as illustrated in FIG. 3b.

Three semi-statical parameters are used to determine the resources to use for the different PUCCH formats:
 $N_{RB}^{(2)}$, provided as part of the system information, controls on which resource block pair the mapping of PUCCH format 1 starts;
 $N_{PUCCH}^{(1)}$ controls the split between the semi-static and dynamic part of PUCCH format 1;
 $N_{cs}^{(1)}$ controls the mix of PUCCH format 1 and format 2 in one resource block. In most cases, the configuration is done such that the two PUCCH formats are mapped to separate sets of resource blocks, but there is also a possibility to have the border between format 1 and 2 within a resource block.

Carrier Aggregation

Figure 4:
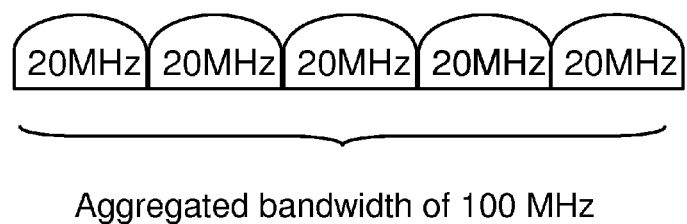
FIG. 4 illustrates a carrier aggregation of five 20 MHz component carriers.

The LTE Rel-8 standard has recently been standardized in 3GPP, supporting bandwidths up to 20 MHz. However, in order to meet the requirements for the International Telecommunication Union's (ITU) concept International Mobile Communications (IMT)-Advanced, 3GPP has initiated work on LTE Rel-10. One of the parts of LTE Rel-10 is to support bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 UE. Each such carrier may be referred to as a Component Carrier (CC). In particular for early LTE Rel-10 deployments it may be expected that there will be a smaller number of LTE Rel-10-capable UEs compared to many LTE legacy UEs. Therefore, it is necessary to assure an efficient use of a wide carrier also for legacy UEs, i.e. that it is possible to implement carriers where legacy UEs may be scheduled in all parts of the wideband LTE Rel-10 carrier. The straightforward way to obtain this is by means of Carrier Aggregation (CA), as introduced in LTE Rel-10. CA implies that an LTE Rel-10 UE may receive multiple CC, where the CC have or at least are enabled to have the same structure as a Rel-8 carrier. CA is schematically illustrated in FIG. 4, where five CC of 20 MHz provide a total aggregated bandwidth of 100 MHz.

The number of aggregated CC as well as the bandwidth of the individual CC may be different for uplink and downlink. A symmetric configuration refers to the case where the number of CCs in downlink and uplink is the same, whereas an asymmetric configuration refers to the case where the number of CCs is different. It is important to note that the number of CCs configured in a cell may be different from the number of CCs seen by a UE. A UE may for example support more downlink CCs than uplink CCs, even though the cell is configured with the same number of uplink and downlink CCs.

Initially, an LTE Rel-10 UE behaves similar to a LTE Rel-8 UE and will be configured with one UL/DL CC pair on which it makes the initial random access. These CCs are called Primary Component Carriers (PCC). In addition to the Uplink (UL)/downlink (DL) PCC pair, the eNB may depending on the UE's capabilities and the network configure the UE with additional CCs, so called Secondary Component Carriers (SCC), as needed. This configuration is based on Radio Resource Configuration (RRC). Due to the heavy signaling and rather slow speed of RRC signaling it is envisioned that a UE may be configured with multiple CCs even though not all of them are currently used. To avoid that a UE has to monitor all configured DL CCs for PDCCH and Physical Downlink Shared Channel (PDSCH) which results in a high power consumption, LTE Rel-10 supports activation of CCs on top of configuration. Since activation is based on Medium Access Control (MAC) signaling—which is faster than RRC signaling—activation and de-activation may follow the number of CCs that is required to fulfill the current data rate needs. Upon arrival of large data amounts multiple CCs are activated, used for data transmission, and de-activated if not needed anymore. All but one CC—the downlink PCC—may be de-activated. Activation provides therefore the possibility to configure multiple CC but only activate them on a need basis. Most of the time a UE would have one or very few CCs activated resulting in a lower reception bandwidth and thus battery consumption.

Scheduling of a CC is done on the PDCCH via downlink assignments. Control information on the PDCCH is formatted as a Downlink Control Information (DCI) message. In Rel-8, a UE only operates with one DL and one UL CC, and the association between DL assignment, UL grants and the corresponding DL and UL CCs is therefore clear. In Rel-10, two modes of CA needs to be distinguished: The first mode of operation is very similar to the operation of multiple Rel-8 terminals; a DL assignment or UL grant contained in a DCI message transmitted on a CC is either valid for the DL CC itself or for associated UL CCs, associated either via cell-specific or UE specific linking. A second mode of operation augments a DCI message with the Carrier Indicator Field (CIF). A DCI containing a DL assignment with CIF is valid for the DL CC indicted with CIF and a DCI containing an UL grant with CIF is valid for the indicated UL CC.

DCI messages for downlink assignments contain among others a resource block assignment, modulation and coding scheme related parameters, and a HARQ redundancy version. In addition to the parameters that relate to the actual downlink transmission, most DCI formats for downlink assignments also contain a bit field for Transmit Power Control (TPC) commands. These TPC commands are used to control the UL power control behavior of the corresponding PUCCH that is used to transmit the HARQ feedback.

PUCCH Transmission with Carrier Aggregation

When support for CA is introduced in LTE Rel-10, a PUCCH format that enables feedback of multiple HARQ bits corresponding to multiple CCs is needed, as will be explained below. Such a PUCCH format is in the following referred to as PUCCH format 3, which is the terminology used in the 3GPP standard. Equivalent terms are CA PUCCH format, and DFTS-OFDM PUCCH format. PUCCH format 1 may also be referred to as a Rel-8 PUCCH.

From a UE perspective, both symmetric and asymmetric UL/DL CC configurations are supported. For some of the configurations, one may consider the possibility to transmit the UL control information on multiple PUCCH or multiple UL CCs. However, this option is likely to result in higher UE power consumption and a dependency on specific UE capabilities. It may also create implementation issues due to inter-modulation products, and would lead to generally higher complexity for implementation and testing.

Therefore, the transmission of PUCCH has no dependency on the UL/DL CC configuration, i.e. as a design principle all UL control information for a UE is semi-statically mapped onto one specific UL CC: the UL PCC, also referred to as the anchor carrier. Furthermore, a cell-specific linking between UL PCC and DL PCC exist, i.e. all terminals sharing the same DL PCC will have the same UL PCC. In an asymmetric deployment scenario it may still be possible that multiple DL CCs are cell-specifically linked with the same UL PCC.

UEs that are configured with only a DL PCC and an UL PCC are operating dynamic ACK/NACK on PUCCH according to Rel-8 specifications, i.e. on the PUCCH format 1 resource as described previously. The first Control Channel Element (CCE) used to transmit PDCCH for the DL assignment determines or identifies the dynamic ACK/NACK resource on PUCCH format 1. If only one DL CC is cell-specifically linked with the UL PCC, no PUCCH collisions may occur since all PDCCH are transmitted using different first CCE.

In a cell asymmetric CA scenario, multiple DL CC may be cell-specifically linked with the same UL CC. Different UEs configured with same UL CC but with different DL CC share the same UL PCC although they have different DL PCCs. UEs receiving their DL assignments on different DL CCs will transmit their HARQ feedback on the same UL CC. In this case it is up to eNB scheduling to ensure that no PUCCH collisions occur.

It may make sense to extend this concept even to UEs which have multiple DL CCs configured. Each PDCCH transmitted on the DL PCC has according to Rel-8 a PUCCH resource reserved on the UL PCC. If a UE is configured with multiple DL CCs but only receives one DL PCC assignment, it could still use the PUCCH format 1 resource on the UL PCC. An alternative would be to use the PUCCH format 3 that enables feedback of HARQ bits corresponding to the number of configured CCs also for a single DL PCC assignment. However, since configuration is a rather slow process and a UE may often be configured with multiple CC even though only the DL PCC is active and used, this would lead to inefficient use of PUCCH format 3 resources.

Upon reception of DL assignments on a single SCC or reception of multiple DL assignments, the PUCCH format 3 should be used. While in the latter case it is obvious to use PUCCH format 3, as that is the only format that supports feedback of HARQ bits of multiple CCs, it is less clear to use PUCCH format 3 in the first case. However, a DL SCC assignment alone is untypical. The eNB scheduler should strive to schedule a single DL CC assignment on the DL PCC and try to de-activate SCCs if not needed. Another issue is that PDCCH for a DL SCC assignment is transmitted on the SCC, assuming that CIF is not configured, and therefore there is no automatically reserved PUCCH format 1 resource on the UL PCC in this case. Using the PUCCH format 1 resource even for stand-alone DL SCC assignments would require reserving PUCCH format 1 resources on the UL PCC for any DL CC that is configured by any UE using this UL PCC. Since stand-alone SCC assignments are untypical this would lead to an unnecessary over provisioning of PUCCH format 1 resources on UL PCC.

A possible error case that may occur is that an eNB schedules a UE on multiple DL CCs including the PCC. If the UE is unable to decode all but the DL PCC assignment it will use PUCCH format 1 instead of PUCCH format 3. To detect this error case, the eNB has to monitor both the PUCCH format 1 and the PUCCH format 3.

Depending on the number of actually received DL assignments the UE has to provide the corresponding number of HARQ feedback bits. In a first case the UE could adopt the PUCCH format 3 according to the number of received assignments and provide feedback accordingly. However, PDCCH with DL assignments may get lost, and adopting the PUCCH format 3 according to the received DL assignments is therefore ambiguous and would require testing of many different hypothesizes at the eNB.

Alternatively the PUCCH format could be set by or included in the activation message. The activation and de-activation of each CC is done with MAC control elements. As MAC signaling and especially HARQ feedback signaling that indicates if the activation command has been successfully received is error prone, also this approach requires testing of multiple hypothesizes at the eNB.

Basing the PUCCH format on the number of configured CC therefore seems to be the safest choice, and has been adopted for systems using Frequency Division Duplex in the 3GPP LTE standard. The configuration of CC is based on RRC signaling as already mentioned previously. After successful reception and application of a new configuration a confirmation message is sent back, thus making configuration based on RRC signaling very safe. The drawback of RRC signaling is the relatively slow speed and that the number of currently used CCs cannot be tracked, leading to a performance loss when the number of actually used CCs is smaller than the number of configured CCs.

PUCCH Format 3

Figure 5A:
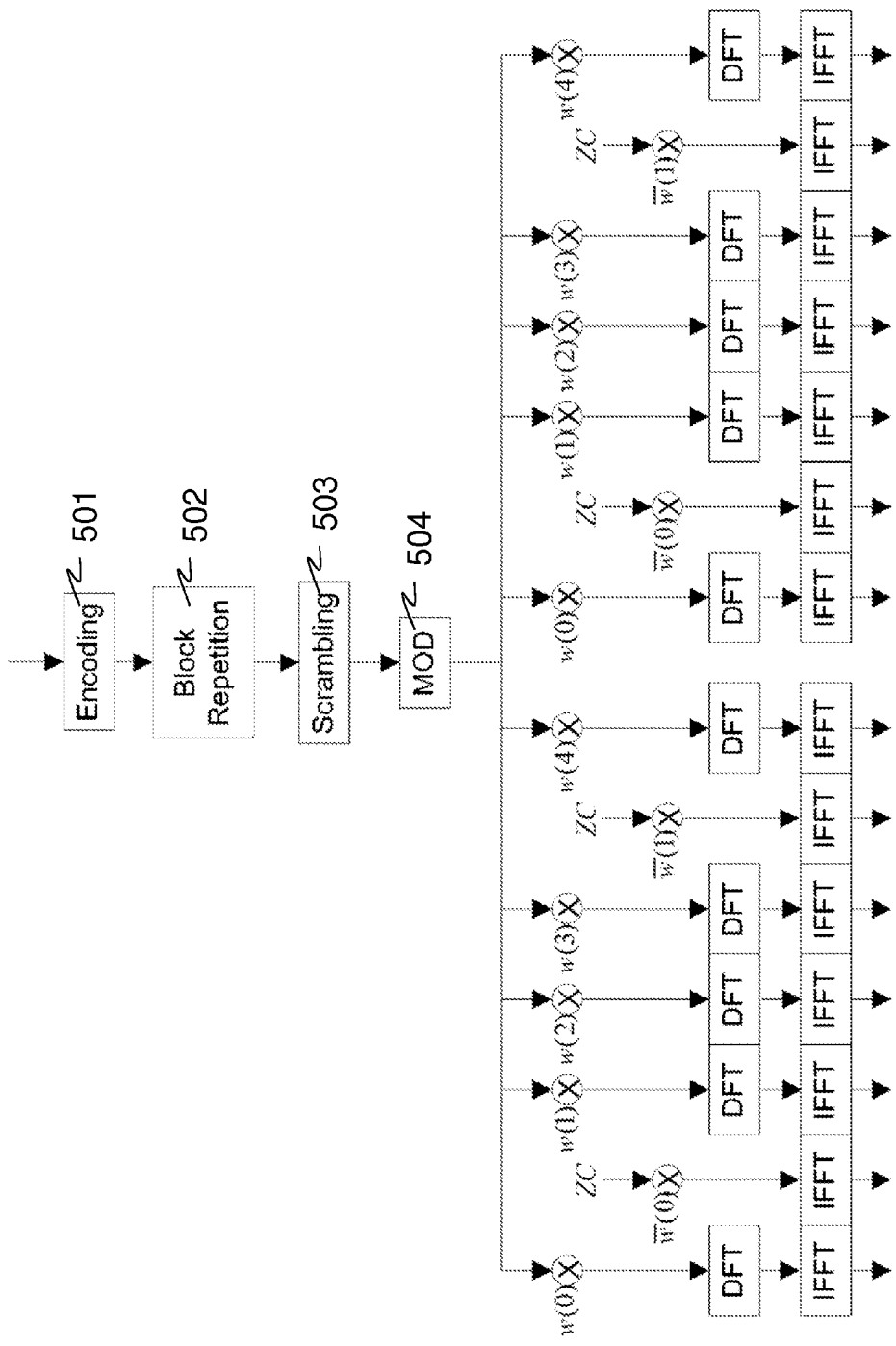
FIGS. 5a-b illustrates the transmission scheme for normal and shortened PUCCH format 3 respectively.

FIG. 5a shows a block diagram of one embodiment of the transmission scheme for a normal PUCCH format 3, which is based on DFTS-OFDM for UEs supporting more than four ACK/NACK bits. The multiple ACK/NACK bits, which may also include scheduling request information bits and/or channel status information bits, are encoded 501, 502 to form 48 coded bits. The coded bits are then scrambled 503 with cell-specific, and possibly DFTS-OFDM symbol dependent sequences. 24 bits are transmitted within the first slot in each DFTS-OFDM symbol and the other 24 bits are transmitted within the second slot in each DFTS-OFDM symbol. The 24 bits per each DFTS-OFDM symbol are converted 504 into 12 QPSK symbols, multiplied with an orthogonal time domain cover sequence [w(0) . . . w(4)] across five DFTS-OFDM symbols, Discrete Fourier Transform (DFT) precoded and transmitted within one resource block in the frequency domain and five symbols in the time domain. The orthogonal time domain cover sequence is UE specific and enables multiplexing of up to five UEs within the same resource block. An example of orthogonal sequences that could be used is shown in Table 1, where each orthogonal sequence is identified by an orthogonal sequence index $n_{oc} \cdot N_{SF,0}^{PUCCH}$ corresponds to the number of orthogonal sequences available for a PRB in a first time slot, i.e. the time slot 0, of the subframe. In this embodiment $N_{SF,0}^{PUCCH}$ is equal to 5.

For the reference signal symbols cyclic shifted Constant Amplitude Zero Auto Correlation (CAZAC) sequences may be used. To improve even further the orthogonality among reference signals, an orthogonal cover code of length two [$\bar{w}(0), \bar{w}(1)$] may be applied to the reference signal symbols.

TABLE 1

Orthogonal sequences [w(0) . . . w($N_{SF,0}^{PUCCH} - 1$)] for $N_{SF,0}^{PUCCH} = 5$.

| Sequence index $n_{oc}(n_s)$ | Orthogonal sequences [w(0) . . . w($N_{SF}^{PUCCH} - 1$)] |
|---|---|
| 0 | [1 1 1 1 1] |
| 1 | [1 $e^{j2\pi/5}$ $e^{j4\pi/5}$ $e^{j6\pi/5}$ $e^{j8\pi/5}$] |
| 2 | [1 $e^{j4\pi/5}$ $e^{j8\pi/5}$ $e^{j2\pi/5}$ $e^{j6\pi/5}$] |
| 3 | [1 $e^{j6\pi/5}$ $e^{j2\pi/5}$ $e^{j8\pi/5}$ $e^{j4\pi/5}$] |
| 4 | [1 $e^{j8\pi/5}$ $e^{j6\pi/5}$ $e^{j4\pi/5}$ $e^{j2\pi/5}$] |

When SRS are configured in a subframe, they are transmitted in the last DFTS-OFDM symbol of the subframe. This implies the need of a special shortened PUCCH format 3, which is muted in the last DFTS-OFDM symbol of the subframe carrying SRS. This muting is done to avoid collisions with SRS transmissions from other UEs when SRS and PUCCH are transmitted in the same subframe.

Figure 5B:
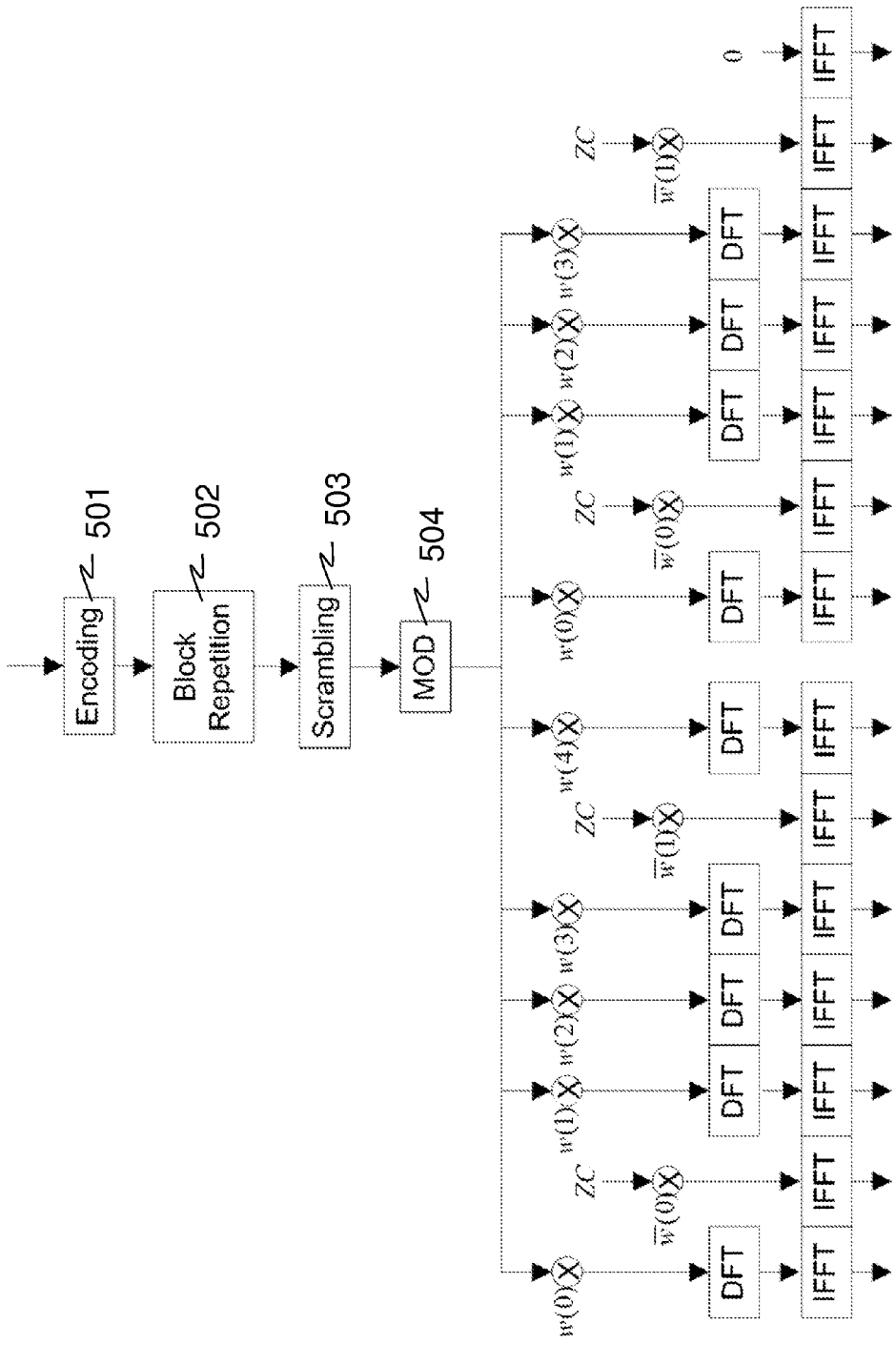

One embodiment of the transmission scheme for such a shortened PUCCH format 3 is illustrated in the block diagram of FIG. 5b. The difference between FIG. 5b and FIG. 5a is that the last DFTS-OFDM symbol is punctured so that the UE does not disturb other UEs that are transmitting SRS in the same resource block as the PUCCH format 3 is transmitted. An advantage of the shortened PUCCH format 3 is that a UE transmitting the PUCCH has the possibility to send SRS in the last DFTS-OFDM symbol of the subframe without transmitting multiple clusters. However, as the last DFTS-OFDM symbol in the second slot of the subframe is punctured, it will only be possible to multiplex four users within the same resource block pair in this embodiment. An example of a four point orthogonal sequence that could be used is shown in Table2. $N_{SF,1}^{PUCCH}$ corresponds to the number of orthogonal sequences available for a PRB in a second time slot, i.e. the time slot 1, of the subframe. In this embodiment, $N_{SF,1}^{PUCCH}$ is equal to 4, as a shortened PUCCH format 3 is used.

Consequently, the UE's choice of using a normal or shortened PUCCH format 3 in a particular subframe is primarily dependent on if the eNB has allocated the cell specific SRS pattern in that subframe or not.

TABLE 2

Orthogonal sequences [w(0) ...
w($N_{SF,1}^{PUCCH}$ − 1)] for $N_{SF,1}^{PUCCH}$ = 4.

| Sequence index $n_{oc}(n_s)$ | Orthogonal sequences [w(0) ... w($N_{SF,1}^{PUCCH}$ − 1)] |
|---|---|
| 0 | [+1 +1 +1 +1] |
| 1 | [+1 −1 +1 −1] |
| 2 | [+1 −1 −1 +1] |
| 3 | [+1 +1 −1 −1] |

The resource assigned to send the PUCCH format 3 on could be given by explicit signaling, for example by RRC signaling, and/or with a dynamic explicit signaling in one or several DCI messages. The resource could also be given by implicit signaling, for example by which CCEs the corresponding PDCCH message is sent on. It could also be given by a combination of explicit and implicit signaling.

From the network perspective, a set of resource blocks are typically set aside for handling PUCCH format 3. This set of resource blocks will most likely be allocated at the two edges of the total system bandwidth, on resource blocks adjacent to either PUCCH format 2 or PUCCH format 1 or both of them, in order to achieve maximum frequency diversity when frequency hopping on the slot boundary.

In the following example, 15 PUCCH format 3 resource blocks or PRBs are configured. In a subframe where no SRS are transmitted and the normal PUCCH format 3 is used, the 15 PUCCH format 3 resources may be organized with the PRB locations and Orthogonal Cover Code (OCC) sequence indices given in Table 3.

TABLE 3

|  | $OCC_0$ | $OCC_1$ | $OCC_2$ | $OCC_3$ | $OCC_4$ |
|---|---|---|---|---|---|
| $PRB_0$ | 0 | 1 | 2 | 3 | 4 |
| $PRB_1$ | 5 | 6 | 7 | 8 | 9 |
| $PRB_2$ | 10 | 11 | 12 | 13 | 14 |

In a subframe where SRS are transmitted and the shortened PUCCH format 3 is used, only four UEs may be sharing the same PRB, instead of five. The 15 PUCCH format 3 resources may therefore be organized with the PRB locations and OCC sequence indices given in Table 4, if a conventional resource block mapping for PUCCH is used:

TABLE 4

|  | $OCC_0$ | $OCC_1$ | $OCC_2$ | $OCC_3$ |
|---|---|---|---|---|
| $PRB_0$ | 0 | 1 | 2 | 3 |
| $PRB_1$ | 4 | 5 | 6 | 7 |
| $PRB_2$ | 8 | 9 | 10 | 11 |
| $PRB_3$ | 12 | 13 | 14 |  |

The 15 PUCCH format 3 resources will thus not fit into the same set of PRBs. The resources used for PUCCH format 3 will extend into one further PRB. This variation of needed resource blocks is a problem, as the network then needs to overprovision PUCCH format 3 resources in a subframe where the normal PUCCH format 3 is used, to handle that the PUCCH format 3 would extend into more resource blocks in a subframe where the shortened PUCCH format 3 is used. Another approach would be to assign the resources for PUCCH format 2 and PUCCH format 1 so that they do not collide with the extended size of the shortened PUCCH format 3. This is however only possible as long as periodicities used for PUCCH format 2 and PUCCH format 1 resources are even multiples of periodicities of subframes reserved for SRS transmission.

Therefore, it is of interest to have the same amount of resources utilized for PUCCH format 3 from all UEs independently of whether the normal or shortened PUCCH format 3 is used.

In embodiments of the invention, the problem of a varying number of resources allocated for PUCCH format 3, dependent on if a normal or a shortened PUCCH format 3 is used, is addressed by a solution where the UE identifies the resource to use for the transmission of control information based on a resource index received from the base station, such that the identified resource is within the same confined set of PRBs, regardless of if a normal or a shortened PUCCH format 3 is used in a subframe. The resource used by the UE to transmit the PUCCH format 3 is thus set to be within a limited amount of signaled resources.

In a first embodiment, the resource used by the UE to transmit the PUCCH format 3 is limited to be within a signaled set of values, also on a per PRB basis. This means that the UE identifies the same PRB for the PUCCH format 3 transmission, regardless of if a normal or a shortened PUCCH format 3 is used. An example of this first embodiment is described hereinafter.

In this example, 15 PUCCH format 3 resources are configured. In a subframe where a normal PUCCH format 3 is used, the 15 PUCCH format 3 resources are organized as illustrated in Table 3.

However, in a subframe where a shortened PUCCH format 3 is used, the 15 PUCCH format 3 resources are organized with the PRB locations and OCC sequence indices given in Table 5.

TABLE 5

|  | $OCC_0$ | $OCC_1$ | $OCC_2$ | $OCC_3$ |
|---|---|---|---|---|
| $PRB_0$ | 0, 4 | 1 | 2 | 3 |
| $PRB_1$ | 8 | 5, 9 | 6 | 7 |
| $PRB_2$ | 12 | 13 | 10, 14 | 11 |

It may be observed that, for instance, PUCCH format 3 resource indices 0 and 4 utilize identical physical radio resources or PRBs. Hence, these two radio resources cannot be used by two UEs in this subframe with shortened PUCCH format 3. To avoid such a collision, the network may schedule the PUSCH for these UEs such that only one will be transmitting PUCCH format 3. When a UE is scheduled to transmit PUSCH data, the control information that normally is transmitted on PUCCH may be transmitted together with the PUSCH data instead, and no PUCCH format 3 resource is thus needed for that UE. However, the first embodiment does not introduce such a scheduling restriction if the PUCCH format 3 resources are assigned such that no more than four resources occupy any of the configured PRBs.

In the first embodiment, the resource index used by the UE to identify the PUCCH format 3 resource is given by the following equation:

$$n_{PUCCH} = (n_{static\_resource} + n_{dynamic\_resource} + n_{implicit}) + N_{SF,0}^{PUCCH} \cdot N_{start}, \quad (1)$$

where $n_{static\_resource}$ is the resource index assigned explicit and statically by using for example RRC signaling, $n_{dynamic\_resource}$ is a dynamic resource indicator which is indicated in one or several DL assignments, $n_{implicit}$ is the implicit resource indicator derived for example for one or several DL assignments' CCE positions, $N_{start}$ is the starting positioning of the PUCCH format 3 resource which could be given in a PUCCH number of PRBs from the band edge, $N_{SF,0}^{PUCCH}=5$, and $N_{DFTS-OFDM}$ is the total number of PUCCH format 3 resources that exist, for example in terms of resource blocks. If any of the resource indices or indicators $n_{static\_resource}$, $n_{dynamic\_resource}$, $n_{implicit}$ are not present, they are set to zero in the formula (1). The resource block to be used by the PUCCH format 3 is in embodiments given by:

$$n_{PRB} = \left\lfloor \frac{n_{PUCCH}}{N_{SF,0}^{PUCCH}} \right\rfloor. \quad (2)$$

The orthogonal sequence index used for the PUCCH format 3 is in embodiments given by:

$$n_{oc}(n_s) = n_{PUCCH} \bmod N_{SF,1}^{PUCCH}, \quad (3)$$

where $N_{SF,1}^{PUCCH}=5$ in case the normal PUCCH format 3 is used and $N_{SF,1}^{PUCCH}=4$ in case the shortened PUCCH format 3 is used.

In a second embodiment, the resource used by the UE to transmit the PUCCH format 3 is limited to be within a confined set of values. An example of this second embodiment is described hereinafter.

In the example, 15 PUCCH format 3 resources are configured in analogy with previous examples. In a subframe where the normal PUCCH format 3 is used, the 15 PUCCH format 3 resources are organized as illustrated in Table 3.

In a subframe where the shortened PUCCH format 3 is used, the 15 PUCCH format 3 resources are organized with the PRB locations and OCC sequence indices given in Table 6.

TABLE 6

|  | $OCC_0$ | $OCC_1$ | $OCC_2$ | $OCC_3$ |
|---|---|---|---|---|
| $PRB_0$ | 0, 12 | 1, 13 | 2, 14 | 3 |
| $PRB_1$ | 4 | 5 | 6 | 7 |
| $PRB_2$ | 8 | 9 | 10 | 11 |

It may be observed that, for instance, PUCCH format 3 resources 0 and 12 utilize identical physical radio resources. Hence, these two PUCCH format 3 resources cannot be used by two UEs in the subframe with the shortened PUCCH format 3. To avoid such a collision, the network may schedule the PUSCH for the UEs such that only one of them will be transmitting PUCCH format 3.

In the second embodiment, the resource index used by the UE to identify the PUCCH format 3 resource is given by the following equation:

$$n_{PUCCH} = (n_{static\_resource} + n_{dynamic\_resource} + n_{implicit}) \bmod(N_{SF,1}^{PUCCH} \cdot N_{DFTS-OFDM}), \quad (4)$$

where $n_{static\_resource}$ is the resource index assigned explicit and statically by using for example RRC signaling, a $n_{dynamic\_resource}$ is a dynamic resource indicator which is indicated in one or several DL assignments, $n_{implicit}$ is the implicit resource indicator derived for example for one ore several DL assignments CCE positions, $N_{SF,1}^{PUCCH}=5$ in case the normal PUCCH format 3 is used and $N_{SF,1}^{PUCCH}=4$ in case shortened PUCCH format 3 is used. If any of the resource indices or indicators $n_{static\_resource}$, $n_{dynamic\_resource}$, $n_{implicit}$ are not present, i.e. are not used to signal the resource index, they are set to zero in the formula (4). In general, $N_{SF,1}^{PUCCH}$ provides the multiplexing capacity or the number of orthogonal sequences available for a resource block in the second slot of a given subframe, and $N_{DFTS-OFDM}$ is the total number of PUCCH format 3 resources that exists, for example in terms of resource blocks.

The resource block to be used by the PUCCH format 3 is in one embodiment given by:

$$n_{PRB} = \left\lfloor \frac{n_{PUCCH}}{N_{SF,1}^{PUCCH}} \right\rfloor + N_{start}, \quad (5)$$

where $N_{start}$ is the starting positioning of the PUCCH format 3, which could be given in a number of PRBs from the band edge. The orthogonal sequence used for the PUCCH format 3 is in one embodiment given by:

$$n_{oc}(n_s) = n_{PUCCH} \bmod N_{SF,1}^{PUCCH}. \quad (6)$$

More generally, one possible implementation of this second embodiment is to apply a modulo operation to the signaled or derived PUCCH resource index, i.e.

$$\tilde{n}_{PUCCH} = n_{PUCCH\text{-}sig} \bmod N_{DFTS\text{-}OFDM\text{-}PUCCH}$$

$$n_{PRB} = f_1(\tilde{n}_{PUCCH})$$

$$n_{oc} = f_2(\tilde{n}_{PUCCH}) \quad (7)$$

where $n_{PUCCH\text{-}sig}$ is the signaled resource index, or a resource index derived e.g. as the sum of implicitly and explicitly signaled indices ($n_{static\_resource} + n_{dynamic\_resource} + n_{implicit}$), to be used in the subframe, and $N_{DFTS\text{-}OFDM\text{-}PUCCH}$ is the total number of PUCCH format 3 resources available in the given subframe. The functions $f_1(n)$ and $f2(n)$ map a given resource index n to the PRB and the OCC respectively.

Figure 6A:
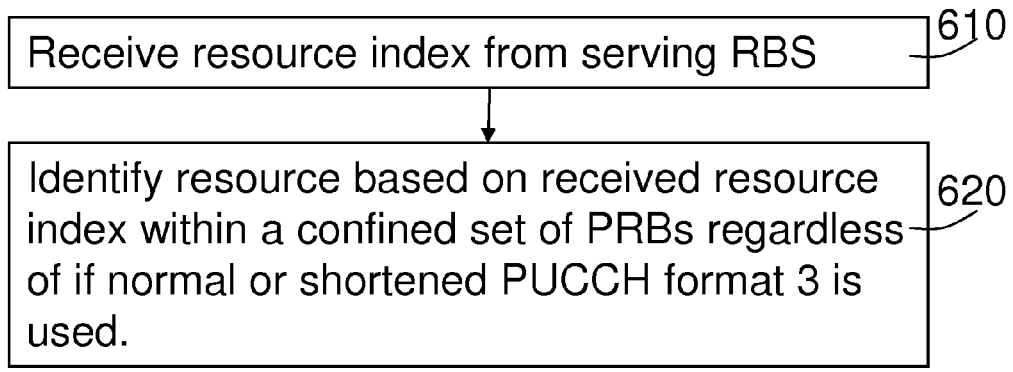
FIGS. 6a-c are flowcharts of the method performed by the UE according to embodiments.

FIG. 6a is a flowchart of the method in the UE of a wireless communication system, according to embodiments. The method is used for identifying a resource to use for a transmission of control information on a PUCCH format 3. The method comprises:

610: Receiving a resource index from a serving RBS.

620: Identifying the resource to use for the transmission of the control information in a subframe based on the received resource index. The identified resource is within a same confined set of PRBs regardless of if a normal or a shortened PUCCH format 3 is used in the subframe.

Figure 6B:
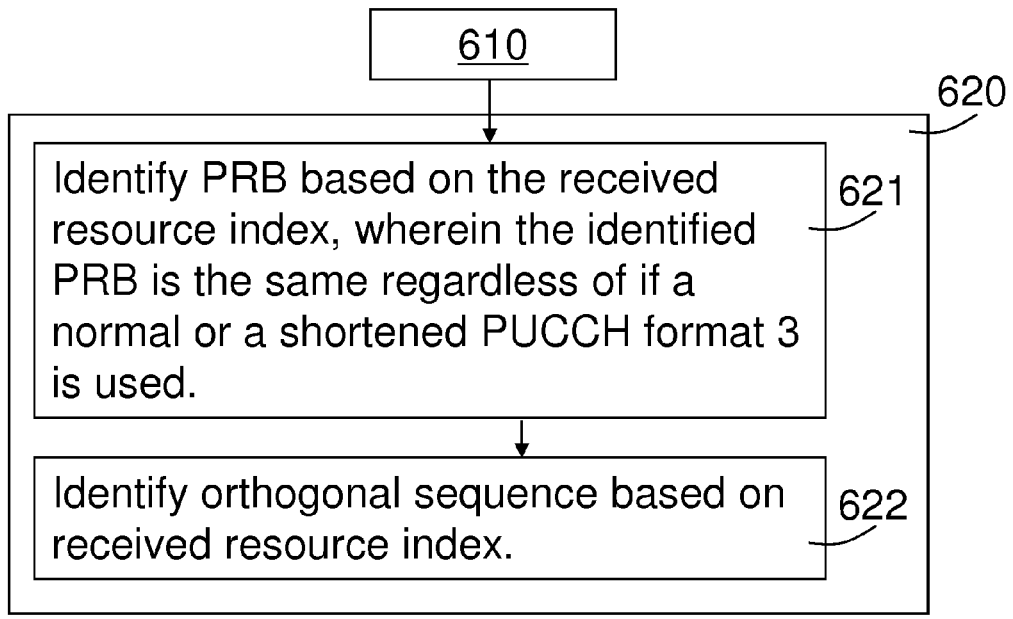

FIG. 6b is a flowchart of the method in the UE according to the first embodiment described above. The method comprises the initial step of receiving 610 a resource index from a serving RBS. The step 620 of identifying the resource to use for the transmission of the control information in a subframe based on the received resource index comprises:

621: Identifying a PRB based on the received resource index, wherein the identified PRB is the same regardless of if a normal or a shortened PUCCH format 3 is used in the subframe. The PRB may in one embodiment be identified based on $n_{PRB}$ given by equation (2) above.

622: Identifying an orthogonal sequence based on an orthogonal sequence index $n_{oc}$ given by equation (3) above.

Figure 6C:
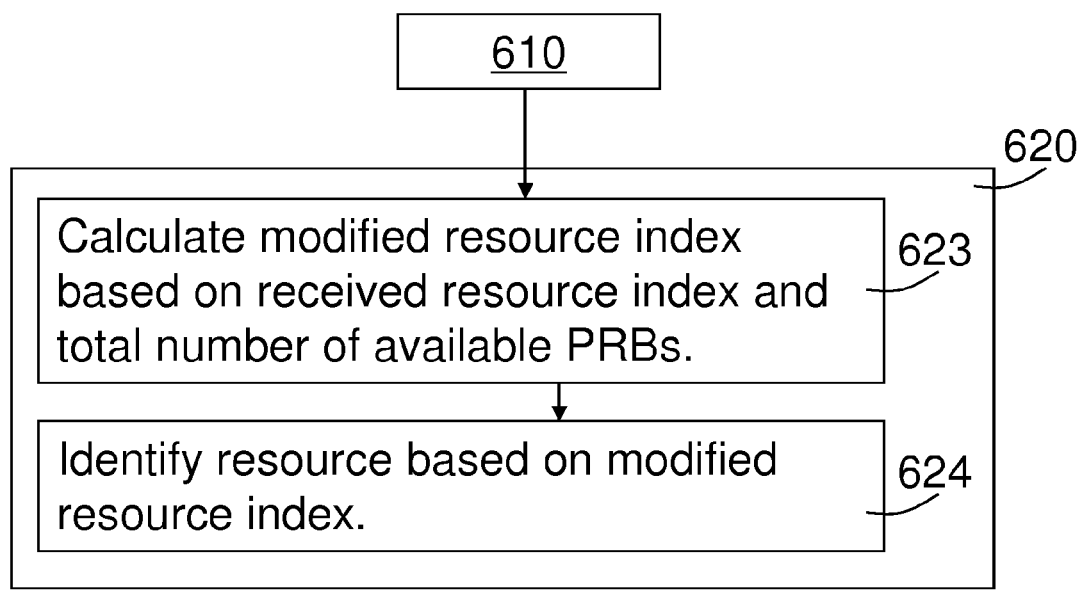

FIG. 6c is a flowchart of the method in the UE according to the second embodiment described above. The method comprises the initial step of receiving 610 a resource index from a serving RBS. The step 620 of identifying the resource to use for the transmission of the control information in a subframe based on the received resource index comprises:

623: Calculating a modified resource index based on the received resource index and a total number of PRBs available for PUCCH format 3.

624: Identifying the resource based on the modified resource index, wherein the identified resource is within a same confined set of PRBs regardless of if a normal or a shortened PUCCH format 3 is used in the subframe. The modified resource index may be calculated as a modulo operation with the received resource index as the dividend and the total number of PRBs available for PUCCH format 3 as the divisor. Based on the modified resource index, a PRB may be identified based on $n_{PRB}$ given by equation (5) above. Furthermore, an orthogonal sequence may be identified based on an orthogonal sequence index $n_{oc}$ given by equation (6) above.

Figure 8A:
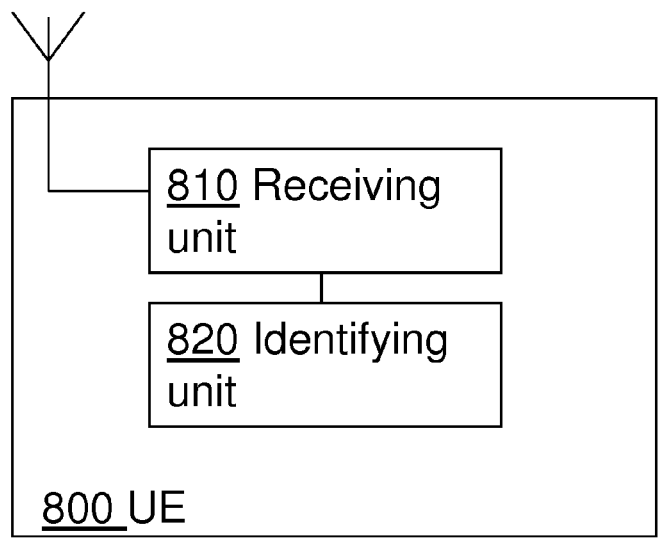
FIGS. 8a-b are block diagrams illustrating the UE according to embodiments.

The UE 800 is schematically illustrated in FIG. 8a according to embodiments. The UE 800 is configured to be used in a wireless communications system, and to identify a resource to use for a transmission of control information on a PUCCH format 3. The UE comprises a receiving unit 810 adapted to receive a resource index from a serving RBS, and an identifying unit 820 adapted to identify the resource to use for the transmission of the control information in a subframe based on the received resource index, wherein the identified resource is within a same confined set of PRBs regardless of if a normal or a shortened PUCCH format 3 is used in the subframe.

In the first embodiment described above, the identifying unit 820 is adapted to identify a PRB based on the received resource index, wherein the identified PRB is the same regardless of if a normal or a shortened PUCCH format 3 is used in the subframe. The identifying unit 820 may be adapted to identify the PRB based on $n_{PRB}$ given by equation (2) above. The identifying unit 820 may also be adapted to identify an orthogonal sequence based on an orthogonal sequence index $n_{oc}$ given by equation (3) above.

In the second embodiment described above, the identifying unit 820 is adapted to calculate a modified resource index based on the received resource index and the total number of PRBs available for PUCCH format 3, and to identify the resource based on the modified resource index. The identified resource is in this embodiment within a same confined set of PRBs regardless of if a normal or a shortened PUCCH format 3 is used in the subframe. The identifying unit 820 may be adapted to calculate the modified resource index as a modulo operation with the received resource index as the dividend and the total number of PRBs available for PUCCH format 3 as the divisor. The identifying unit 820 may be adapted to identify the PRB based on $n_{PRB}$ given by equation (5) above. Furthermore, the identifying unit 820 may be adapted to identify an orthogonal sequence based on an orthogonal sequence index $n_{oc}$ given by equation (6) above.

The units described above with reference to FIG. 8a are logical units and do not necessarily correspond to separate physical units.

Figure 8B:
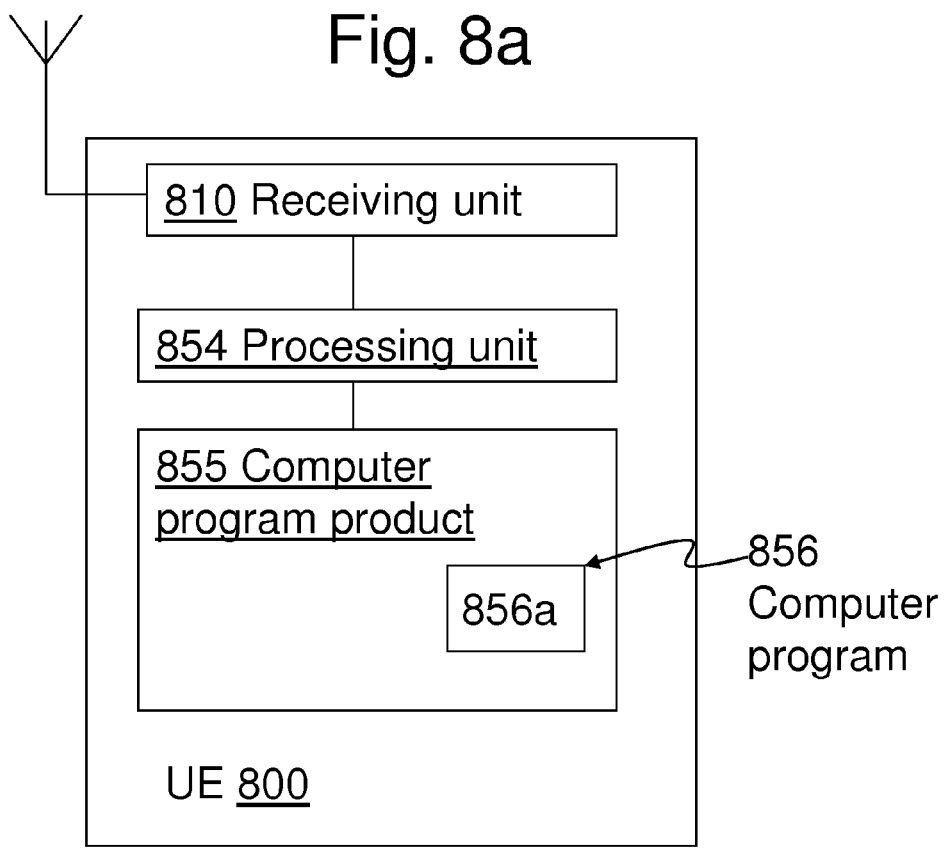

FIG. 8b schematically illustrates an embodiment of the UE 800, which is an alternative way of disclosing the embodiment illustrated in FIG. 8a. The UE 800 comprises the receiving unit 810 for receiving a resource index from a serving RBS. The UE 800 also comprises a processing unit 854 which may be a single unit or a plurality of units. Furthermore, the UE 800 comprises at least one computer program product 855 in the form of a non-volatile memory, e.g. an EEPROM (Electrically Erasable Programmable Read-Only Memory), a flash memory or a disk drive. The computer program product 855 comprises a computer program 856, which comprises code means which when run on the UE 800 causes the processing unit 854 on the UE 800 to perform the steps of the procedures described earlier in conjunction with FIG. 6a-c.

Hence in the embodiments described, the code means in the computer program 856 of the UE 800 comprises an identifying module 856a for identifying the resource to use for the transmission of the control information in a subframe based on the received resource index, wherein the identified resource is within a same confined set of PRBs regardless of if a normal or a shortened PUCCH format 3 is used in the subframe. The code means may thus be implemented as computer program code structured in computer program modules. The module 856a essentially performs the step 620 of the flow in FIG. 6a, to emulate the network node described in FIG. 8a. In other words, when the module 856a is run on the processing unit 854, it corresponds to the unit 820 of FIG. 8a.

Although the code means in the embodiment disclosed above in conjunction with FIG. 8b are implemented as a computer program module which when run on the UE 800 causes the UE to perform the step described above in the conjunction with FIG. 6a, one or more of the code means may in alternative embodiments be implemented at least partly as hardware circuits.

Figure 7:
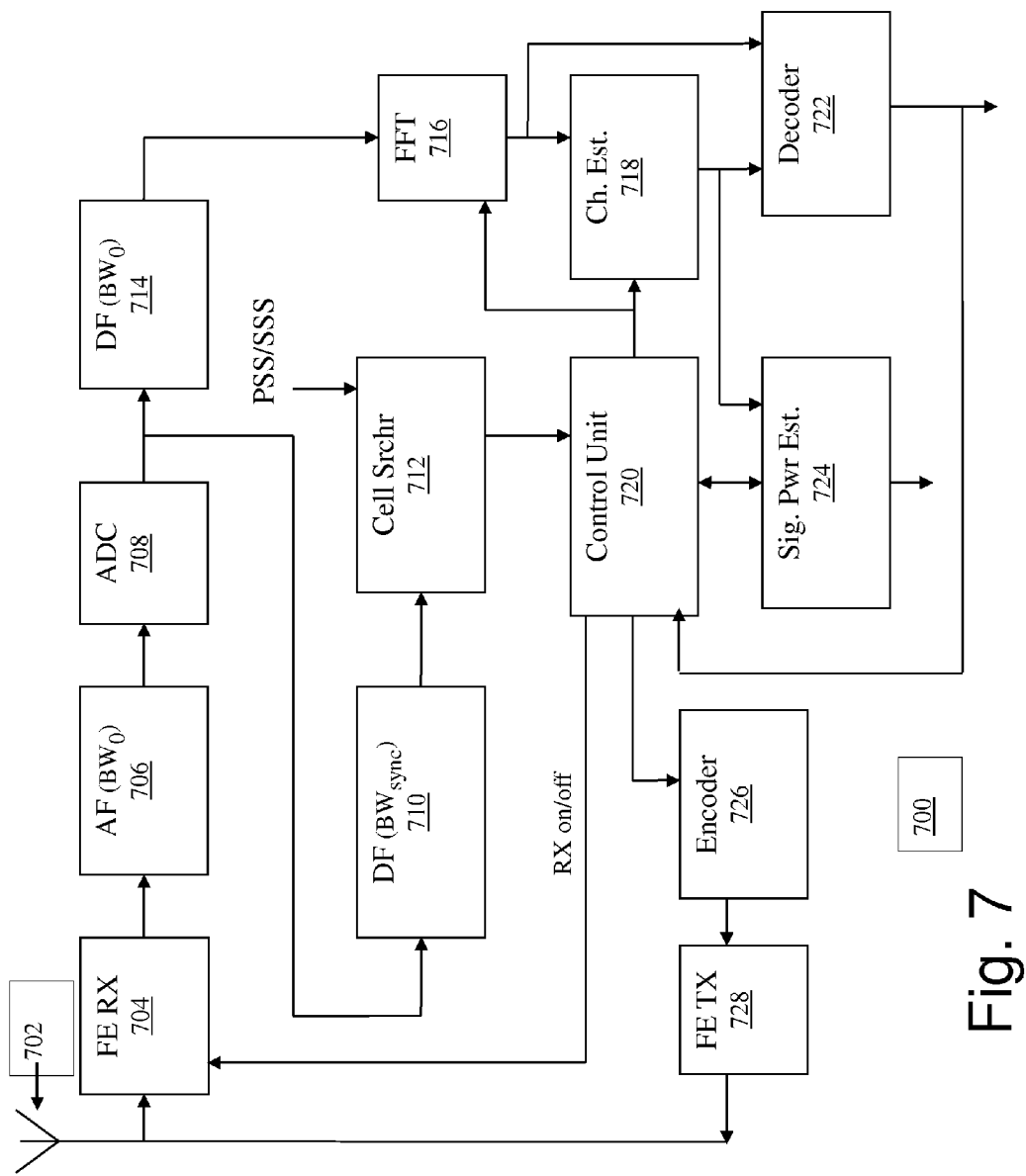
FIG. 7 is a block diagram illustrating an arrangement in the UE that may implement the method illustrated in the flowcharts of FIGS. 6a-c.

FIG. 7 is a block diagram of an arrangement 700 in a UE that may implement the method described above. It will be appreciated that the functional blocks depicted in FIG. 7 may be combined and re-arranged in a variety of equivalent ways, and that many of the functions may be performed by one or more suitably programmed digital signal processors. Moreover, connections among and information provided or exchanged by the functional blocks depicted in FIG. 7 may be altered in various ways to enable a UE to implement other methods involved in the operation of the UE.

As depicted in FIG. 7, a UE receives a DL radio signal through an antenna 702 and typically down-converts the received radio signal to an analog baseband signal in a front end receiver (Fe RX) 704. The baseband signal is spectrally shaped by an analog filter 706 that has a bandwidth $BW_0$, and the shaped baseband signal generated by the filter 706 is converted from analog to digital form by an analog-to-digital converter (ADC) 708. The digitized baseband signal is further spectrally shaped by a digital filter 710 that has a bandwidth $BW_{sync}$, which corresponds to the bandwidth of synchronization signals or symbols included in the DL signal. The shaped signal generated by the filter 710 is provided to a cell search unit 712 that carries out one or more methods of searching for cells as specified for the particular communication system, e.g., 3G LTE. Typically, such methods involve detecting predetermined primary and/or secondary synchronization channel (P/S-SCH) signals in the received signal.

The digitized baseband signal is also provided by the ADC 708 to a digital filter 714 that has the bandwidth $BW_0$, and the filtered digital baseband signal is provided to a processor 716 that implements a Fast Fourier Transform (FFT) or other suitable algorithm that generates a frequency-domain (spectral) representation of the baseband signal. A channel estimation unit 718 receives signals from the processor 716 and generates a channel estimate $H_{i,j}$ for each of several subcarriers i and cells j based on control and timing signals provided by a control unit 720, which also provides such control and timing information to the processor 716.

The estimator 718 provides the channel estimates $H_i$ to a decoder 722 and a signal power estimation unit 724. The decoder 722, which also receives signals from the processor 716, is suitably configured to extract information from RRC or other messages as described above and typically generates signals subject to further processing in the UE (not shown). The estimator 724 generates received signal power measurements (e.g., estimates of reference signal received power (RSRP), received subcarrier power $S_i$, signal to interference ratio (SIR), etc.). The estimator 724 may generate estimates of RSRP, reference signal received quality (RSRQ), received signal strength indicator (RSSI), received subcarrier power $S_i$, SIR, and other relevant measurements, in various ways in response to control signals provided by the control unit 720. Power estimates generated by the estimator 724 are typically used in further signal processing in the UE. The estimator 724 (or the searcher 712, for that matter) is configured to include a suitable signal correlator.

In the arrangement depicted in FIG. 7, the control unit 720 keeps track of substantially everything needed to configure the searcher 712, processor 716, estimation unit 718, and estimator 724. For the estimation unit 718, this includes both method and cell identity (for reference signal extraction and cell-specific scrambling of reference signals). Communication between the searcher 712 and the control unit 720 includes cell identity and, for example, cyclic prefix configuration. The control unit 720 may determine which of several possible estimation methods is used by the estimator 718 and/or by the estimator 724 for measurements on the detected cell(s). In addition, the control unit 720, which typically may include a correlator or implement a correlator function, may receive information signaled by the network and may control the on/off times of the Fe RX 704.

The control unit 720 provides appropriate information to an encoder 726, which generates modulation symbols or similar information that is provided to a transmitter front-end (FE TX) 728, which generates a transmission signal appropriate to the communication system. As depicted in FIG. 7, the transmission signal is provided to the antenna 702. The control unit 720 with the encoder 726 is suitably configured to generate RRC and other messages sent by the UE to the network as described above.

The control unit and other blocks of the UE may be implemented by one or more suitably programmed electronic processors, collections of logic gates, etc. that processes information stored in one or more memories. As noted above, the UE includes memory or other information storage functionality suitable for carrying out the methods and receiving and generating the signals described above in cooperation with the control unit and software executed by the control unit. The stored information may include program instructions and data that enable the control unit to implement the methods described above. It will be appreciated that the control unit typically includes timers, etc. that facilitate its operations.

The above mentioned and described embodiments are only given as examples and should not be limiting. Other solutions, uses, objectives, and functions within the scope of the accompanying patent claims may be possible.

Abbreviations
3GPP Third Generation Partnership Project
ACK Acknowledgement
CA Carrier Aggregation
CAZAC Constant Amplitude Zero Auto Correlation
CC Component Carrier
CCE Control Channel Elements
CIF Carrier Indicator Field
CN Core Network
DCI Downlink Control Information
DFT Discrete Fourier Transform
DFTS DFT Spread
DL Downlink
eNB,eNodeB evolved NodeB
E-UTRAN Evolved UTRAN
UTRAN Universal Terrestrial Radio Access Network
FDD Frequency Division Duplex
HARQ Hybrid Automatic Repeat Request
LTE Long term evolution
MAC Medium Access Control
MHz Megahertz
NACK Non Acknowledgement
OCC Orthogonal Cover Code
OFDM Orthogonal Frequency Division Multiplexing
PCC Primary Component Carrier
PDCCH Physical Downlink Control Channel
PDSCH Physical Downlink Shared Channel
PRB Physical Resource Block
PUCCH Physical Uplink Control Channel
RE Resource Element
Rel-10 Release 10
Rel-8 Release 8
RRC Radio Resource Configuration
SCC Secondary Component Carrier
SRS Sounding Reference Signals
TPC Transmit Power Control
UE User equipment
UL Uplink
UMTS Universal Mobile Telecommunications System

The invention claimed is:

1. A method in a user equipment of a wireless communication system, for identifying a resource to use for a transmission of control information on a physical uplink control channel, PUCCH, format 3, the method comprising:
receiving a resource index from a serving radio base station,
identifying the resource to use for the transmission of the control information in a subframe based on the received resource index, wherein the identified resource is within a same confined set of physical resource blocks regardless of if a normal or a shortened PUCCH format 3 is used in the subframe, and
wherein identifying the resource comprises identifying an orthogonal sequence based on an orthogonal sequence index $n_{oc}$ given by the following equation:

$$n_{oc} = n_{PUCCH} \bmod N_{SF,1}^{PUCCH}$$

where $n_{PUCCH}$ is the received resource index, and $N_{SF,1}^{PUCCH}$ is a number of orthogonal sequences available for a physical resource block in a second time slot of the subframe.

2. The method according to claim 1, wherein identifying the resource comprises identifying a physical resource block based on the received resource index, wherein the identified physical resource block is the same regardless of if a normal or a shortened PUCCH format 3 is used in the subframe.

3. The method according to claim 2, wherein the physical resource block is identified based on $n_{PRB}$ given by the following equation:

$$n_{PRB} = \left\lfloor \frac{n_{PUCCH}}{N_{SF,0}^{PUCCH}} \right\rfloor$$

where $n_{PUCCH}$ is the received resource index and $N_{SF,0}^{PUCCH}$ is a number of orthogonal sequences available for a physical resource block in a first time slot of the subframe.

4. The method according to claim 1, wherein identifying the resource comprises:
calculating a modified resource index based on the received resource index and a total number of physical resource blocks available for PUCCH format 3, and
identifying the resource based on the modified resource index, wherein the identified resource is within a same confined set of physical resource blocks regardless of if a normal or a shortened PUCCH format 3 is used in the subframe.

5. The method according to claim 4, wherein the modified resource index is calculated as a modulo operation with the received resource index as the dividend and the total number of physical resource blocks available for PUCCH format 3 as the divisor.

6. The method according to claim 4, wherein identifying the resource based on the modified resource index comprises identifying a physical resource block based on $n_{PRB}$ given by the following equation:

$$n_{PRB} = \left\lfloor \frac{\tilde{n}_{PUCCH}}{N_{SF,1}^{PUCCH}} \right\rfloor + N_{start}$$

where $\tilde{n}_{PUCCH}$ is the modified resource index, $N_{SF,1}^{PUCCH}$ is a number of orthogonal sequences available for a physical resource block in a second time slot of the subframe, and $N_{start}$ is a starting position of the confined set of physical resource blocks.

7. The method according to claim 4, wherein identifying the resource based on the modified resource index comprises identifying an orthogonal sequence based on an orthogonal sequence index $n_{oc}$ given by the following equation:

$$n_{oc} = \tilde{n}_{PUCCH} \bmod N_{SF,1}^{PUCCH}$$

where $\tilde{n}_{PUCCH}$ is the modified resource index, and $N_{SF,1}^{PUCCH}$ is a number of orthogonal sequences available for a physical resource block in a second time slot of the subframe.

8. A user equipment for a wireless communication system, configured to identify a resource to use for a transmission of control information on a physical uplink control channel, PUCCH, format 3, the user equipment comprising:
  a receiving unit adapted to receive a resource index from a serving radio base station,
  an identifying unit adapted to identify the resource to use for the transmission of the control information in a subframe based on the received resource index, wherein the identified resource is within a same confined set of physical resource blocks regardless of if a normal or a shortened PUCCH format 3 is used in the subframe, and
  wherein the identifying unit is adapted to identify an orthogonal sequence based on an orthogonal sequence index $n_{oc}$ given by the following equation:

$$n_{oc} = n_{puccH} \bmod N_{SF,1}^{PUCCH}$$

where $n_{PUCCH}$ is the received resource index, and $N_{SF,1}^{PUCCH}$ is a number of orthogonal sequences available for a physical resource block in a second time slot of the subframe.

9. The user equipment according to claim 8, wherein the identifying unit is adapted to identify a physical resource block based on the received resource index, wherein the identified physical resource block is the same regardless of if a normal or a shortened PUCCH format 3 is used in the subframe.

10. The user equipment according to claim 9, wherein the identifying unit is adapted to identify the physical resource block based on $n_{PRB}$ given by the following equation:

$$n_{PRB} = \left\lfloor \frac{n_{PUCCH}}{N_{SF,0}^{PUCCH}} \right\rfloor$$

where $n_{PUCCH}$ is the received resource index and $N_{SF,0}^{PUCCH}$ is a number of orthogonal sequences available for a physical resource block in a first time slot of the subframe.

11. The user equipment according to claim 8, wherein the identifying unit is further adapted to calculate a modified resource index based on the received resource index and a total number of physical resource blocks available for PUCCH format 3, and to identify the resource based on the modified resource index, wherein the identified resource is within a same confined set of physical resource blocks regardless of if a normal or a shortened PUCCH format 3 is used in the subframe.

12. The user equipment according to claim 11, wherein the identifying unit is further adapted to calculate the modified resource index as a modulo operation with the received resource index as the dividend and the total number of physical resource blocks available for PUCCH format 3 as the divisor.

13. The user equipment according to claim 11, wherein the identifying unit is adapted to identify a physical resource block based on $n_{PRB}$ given by the following equation:

$$n_{PRB} = \left\lfloor \frac{\tilde{n}_{PUCCH}}{N_{SF,1}^{PUCCH}} \right\rfloor + N_{start}$$

where $\tilde{n}_{PUCCH}$, is the modified resource index, $N_{SF,1}^{PUCCH}$ is a number of orthogonal sequences available for a physical resource block in a second time slot of the subframe, and $N_{start}$ is a starting position of the confined set of physical resource blocks.

14. The user equipment according to claim 11, wherein the identifying unit is adapted to identify an orthogonal sequence based on an orthogonal sequence index $n_{oc}$ given by the following equation:

$$n_{oc} = \tilde{n}_{PUCCH} \bmod N_{SF,1}^{PUCCH}$$

where $\tilde{n}_{PUCCH}$ is the modified resource index, and $N_{SF,1}^{PUCCH}$ is a number of orthogonal sequences available for a physical resource block in a second time slot of the subframe.

* * * * *

UNITED STATES PATENT AND TRADEMARK OFFICE
CERTIFICATE OF CORRECTION

PATENT NO. : 8,954,064 B2  
APPLICATION NO. : 13/122529  
DATED : February 10, 2015  
INVENTOR(S) : Baldemair et al.

Page 1 of 1

It is certified that error appears in the above-identified patent and that said Letters Patent is hereby corrected as shown below:

IN THE SPECIFICATION

In Column 13, Line 57, delete "a $n_{dynamic\_resource}$" and insert -- $n_{dynamic\_resource}$ --, therefor.

In Column 13, Line 59, delete "one ore" and insert -- one or --, therefor.

In Column 13, Line 62, delete "case shortened" and insert -- case the shortened --, therefor.

In Column 14, Lines 21-25, after Equation (7), insert -- , --.

IN THE CLAIMS

In Column 19, Line 49, in Claim 8, delete "$n_{oc}=n_{puccH}$" and insert -- $n_{oc}=n_{PUCCH}$ --, therefor.

In Column 20, Line 41, in Claim 13, delete "$ñ_{PUCCH},$" and insert -- $ñ_{PUCCH}$ --, therefor.

Signed and Sealed this  
Thirteenth Day of October, 2015

Michelle K. Lee  
*Director of the United States Patent and Trademark Office*